United States Patent
Nakamura et al.

(10) Patent No.: US 9,002,556 B2
(45) Date of Patent: Apr. 7, 2015

(54) TORQUE RESPONSE CONTROL APPARATUS FOR ELECTRIC MOTOR OF VEHICLE

(75) Inventors: Yohei Nakamura, Sagamihara (JP); Isamu Kazama, Odawara (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 135 days.

(21) Appl. No.: 13/700,356

(22) PCT Filed: Apr. 14, 2011

(86) PCT No.: PCT/JP2011/059251
§ 371 (c)(1), (2), (4) Date: Nov. 27, 2012

(87) PCT Pub. No.: WO2011/152128
PCT Pub. Date: Dec. 8, 2011

(65) Prior Publication Data
US 2013/0124024 A1 May 16, 2013

(30) Foreign Application Priority Data
May 31, 2010 (JP) .................................. 2010-123779

(51) Int. Cl.
B60L 9/00 (2006.01)
B60L 11/00 (2006.01)
(Continued)

(52) U.S. Cl.
CPC . B60L 15/20 (2013.01); B60L 7/14 (2013.01); B60L 11/1803 (2013.01);
(Continued)

(58) Field of Classification Search
CPC ... B60L 2240/443; B60L 15/20; B60L 15/25; B60L 11/12; B60L 2240/527; B60L 11/14; B60L 15/2051; B60W 10/11; B60W 10/02; B60W 30/16; B60W 30/09; B60W 2710/0666; B60W 30/19; B60W 20/00; B60K 6/445; B60K 6/448; B60K 6/36; B60K 6/365
USPC .................. 701/22, 51, 53, 41, 45, 42, 54, 44; 180/179, 282, 65.265, 402, 446, 65.21
See application file for complete search history.

(56) References Cited

U.S. PATENT DOCUMENTS 6,078,859 A * 6/2000 Jastrzebski et al. ............. 701/93
6,098,733 A * 8/2000 Ibaraki et al. .............. 180/65.28
(Continued)

FOREIGN PATENT DOCUMENTS

JP 10-164704 A 6/1998
JP 10-201013 A 7/1998
(Continued)

OTHER PUBLICATIONS

Machine translation of JP 10-201013, 24 pages.
(Continued)

*Primary Examiner* — Calvin Cheung
*Assistant Examiner* — Luis A Martinez Borrero
(74) *Attorney, Agent, or Firm* — Foley & Lardner LLP

(57) ABSTRACT

A torque response control apparatus for an electric motor of a vehicle comprises a motor torque response control means that is configured to carry out finding a difference between a required acceleration that is variable in accordance with a change of a vehicle driving condition and an actual acceleration that is obtained, at the time of the change of the vehicle driving condition, with the aid of a torque characteristic of the electric motor, the difference being caused by the torque characteristic of the electric motor in which the maximum torque is varied in accordance with a rotation speed of the electric motor; and controlling the torque response of the electric motor in a manner to cause a driver to feel the difference of the actual acceleration from the required acceleration to be small by compensating the difference between the required acceleration and the actual acceleration.

7 Claims, 5 Drawing Sheets

(51) Int. Cl.
*G05D 1/00* (2006.01)
*G05D 3/00* (2006.01)
*G06F 7/00* (2006.01)
*G06F 17/00* (2006.01)
*B60L 15/20* (2006.01)
*B60L 7/14* (2006.01)
*B60L 11/18* (2006.01)
*B60W 50/08* (2012.01)

(52) U.S. Cl.
CPC ......... *B60L 15/2009* (2013.01); *B60W 50/087* (2013.01); *B60L 2240/12* (2013.01); *B60L 2240/421* (2013.01); *B60L 2240/423* (2013.01); *B60L 2250/28* (2013.01); *B60L 2270/145* (2013.01); *B60W 2710/083* (2013.01); *Y02T 10/7005* (2013.01); *Y02T 10/642* (2013.01)

(56) References Cited

U.S. PATENT DOCUMENTS

| | | | |
|---|---|---|---|
| 6,249,097 B1* | 6/2001 | Frey et al. | 318/257 |
| 6,327,524 B1* | 12/2001 | Chen | 701/22 |
| 6,377,007 B1 | 4/2002 | Ozaki et al. | |
| 6,603,278 B2* | 8/2003 | Oshima et al. | 318/139 |
| 2004/0210356 A1* | 10/2004 | Wilton et al. | 701/22 |
| 2006/0178797 A1* | 8/2006 | Larsen et al. | 701/54 |
| 2006/0194670 A1* | 8/2006 | Heap et al. | 477/3 |
| 2007/0296281 A1* | 12/2007 | Choi | 310/12 |
| 2009/0048751 A1* | 2/2009 | Nakai et al. | 701/70 |
| 2009/0118936 A1* | 5/2009 | Heap et al. | 701/54 |
| 2010/0025131 A1* | 2/2010 | Gloceri et al. | 180/65.28 |
| 2010/0168943 A1* | 7/2010 | Fukushiro et al. | 701/22 |
| 2010/0173745 A1* | 7/2010 | Hase et al. | 477/5 |
| 2010/0184559 A1* | 7/2010 | Tang et al. | 477/5 |
| 2010/0240491 A1* | 9/2010 | Vyas et al. | 477/3 |
| 2010/0268408 A1* | 10/2010 | Yuki | 701/22 |
| 2010/0305797 A1* | 12/2010 | Jiang | 701/22 |
| 2011/0106356 A1* | 5/2011 | Tsuda et al. | 701/22 |
| 2011/0106388 A1* | 5/2011 | Boeckenhoff et al. | 701/70 |

FOREIGN PATENT DOCUMENTS

| | | |
|---|---|---|
| JP | 11-205913 A | 7/1999 |
| JP | 2001-025109 A | 1/2001 |
| JP | 2003-111213 A | 4/2003 |
| JP | 2006-274962 A | 10/2006 |

OTHER PUBLICATIONS

Machine translation of JP 2006-274962, 18 pages.
Machine translation of JP 10-164704, 22 pages.
Machine translation of JP 2001-025109, 15 pages.
Machine translation of JP 2003-111213, 28 pages.
Japanese Office Action, Dec. 3, 2013, 3 pages.

* cited by examiner

PRIMARY DELAY FILTER TIME CONSTANT = 1- exp(-T/Δt)

TORQUE RESPONSE CONTROL APPARATUS FOR ELECTRIC MOTOR OF VEHICLE

TECHNICAL FIELD

The present invention relates to a torque response control apparatus for an electric motor of a vehicle, which controls a torque response of the electric motor in such a manner that a sense of acceleration of an electric vehicle, which drives road wheels by using a torque from an electric motor, is similar to that of a required acceleration that is made in accordance with a change of an operation condition of the vehicle.

BACKGROUND ART

In motor vehicles, even under a change of the same operation condition (viz., change in operation condition induced by an amount of depression of an accelerator pedal and/or change in running condition induced by a vehicle speed), an acceleration obtained is largely changed in accordance with an output torque characteristic of a driving power source, and thus, actually, it is impossible for a driver to get or enjoy an acceleration that is desired by him or her in accordance with a change of the operation condition (viz., change in operation condition induced by an amount of depression of the accelerator pedal and/or change in running condition induced by the vehicle speed).

The reason is that output torque characteristics of most power sources do not correspond to a change of the required acceleration expected by the driver in response to an operation handling, and thus, it tends to occur that the driver is given such a dissatisfaction that a vehicle running performance (viz., sense of acceleration) is not sufficient and a delicate driving manipulation is not effected due to an excessive torque.

Thus, in common motor vehicles having an engine mounted thereon, a transmission for adjusting a torque from the power source is arranged at an output side of the power source for obtaining an acceleration as expected by the driver.

Also in electric motor vehicles having an electric motor installed thereon as a power source, since the electric motor, like in the above-mentioned engine, does not bring about an expected desired acceleration due to the characteristic of the output torque from the motor, it tends to occur that the driver is given such a dissatisfaction that a vehicle running performance (viz., sense of acceleration) is not sufficient and a delicate driving to manipulation is not effected due to an excessive torque.

However, if, in the electric motor vehicles using the electric motor as the driving power source, a transmission is arranged at an output side of the motor for intending to get the desired acceleration, the transmission becomes a factor for increasing a friction loss, and besides this, since control of the transmission consumes energy, a travel distance (viz., mileage per one charge) of the vehicle becomes shorter, which is a serious problem.

Accordingly, in case of electric motor vehicles, the above-mentioned ordinary solution of mounting a transmission at the output side of an electric motor can not be adopted.

In case of electric motor motors, the response of output torque is easily controlled unlike in case of an internal combustion engine or the like, and thus, the inventors have considered that if a sense of acceleration is suitably adjusted by controlling the torque response, the driver may be given a satisfaction.

As a technology to control the torque response of an electric motor, there has been proposed only one technique in which as is described in Patent Document 1, since an electric motor generates a large torque at a lower speed and a torsional vibration is inevitably produced in a motor driving system, the torque response is so controlled as to suppress generation of the torsional vibration in the motor driving system.

However, the proposed technique disclosed in Patent Document 1 is to control the torque response of the electric motor in a manner to suppress generation of the torsional vibration in the motor driving system, which is not a torque responsive control technique for providing the driver with a sense of acceleration that is desired by him or her in accordance with a change of an operation condition of the vehicle.

Accordingly, the proposed technique described in Patent Document 1 does not solve the above-mentioned problems in which a driver is given such a dissatisfaction that a vehicle running condition (viz., sense of acceleration) is not sufficient and a delicate driving manipulation is not effected due to an excessive torque.

PRIOR ART DOCUMENT

Patent Document

Patent Document 1: Japanese Laid-open Patent Application (Tokkai) 2003-111213

SUMMARY OF INVENTION

In view of the above-mentioned problems, it is an object of the present invention to provide a torque response control device for an electric motor of a vehicle, which controls a torque response of the electric motor in such a manner that a sense of acceleration of the vehicle is similar to that of acceleration desired in accordance with a change of an operation condition of the vehicle, so that the problem of giving a driver a dissatisfaction due to insufficient sense of acceleration and the other problem of giving the driver a sense of difficulty in effecting a delicate driving manipulation due to an excessive torque are solved.

In order to attain the above-mentioned object, the torque response control device of the present invention controls a vehicle driven by a torque produced by an electric motor, in such a manner as to find a difference between a required acceleration that is variable in accordance with a change of a vehicle driving condition and an actual acceleration that is obtained, at the time of a change of the vehicle driving condition, with the aid of a torque characteristic of the electric motor, and control the torque response of the electric motor in a manner to cause a driver to feel the difference of the actual acceleration from the required acceleration to be small by compensating the difference between the required acceleration and the actual acceleration.

According to the torque response control device for an electric motor of a vehicle of the present invention, due to the above-mentioned torque response control applied to the electric motor, a driver can obtain a sense of acceleration with such a feeling that the difference of the actual acceleration from the required acceleration is small.

Accordingly, the problem of giving the driver a dissatisfaction due to insufficient sense of acceleration and the other problem of giving the driver a sense of difficulty in effecting a delicate driving manipulation due to an excessive torque are not caused.

EMBODIMENT FOR CARRYING OUT INVENTION

In the following, an embodiment of the present invention will be described in detail with reference the drawings.

[Construction]

Figure 1:
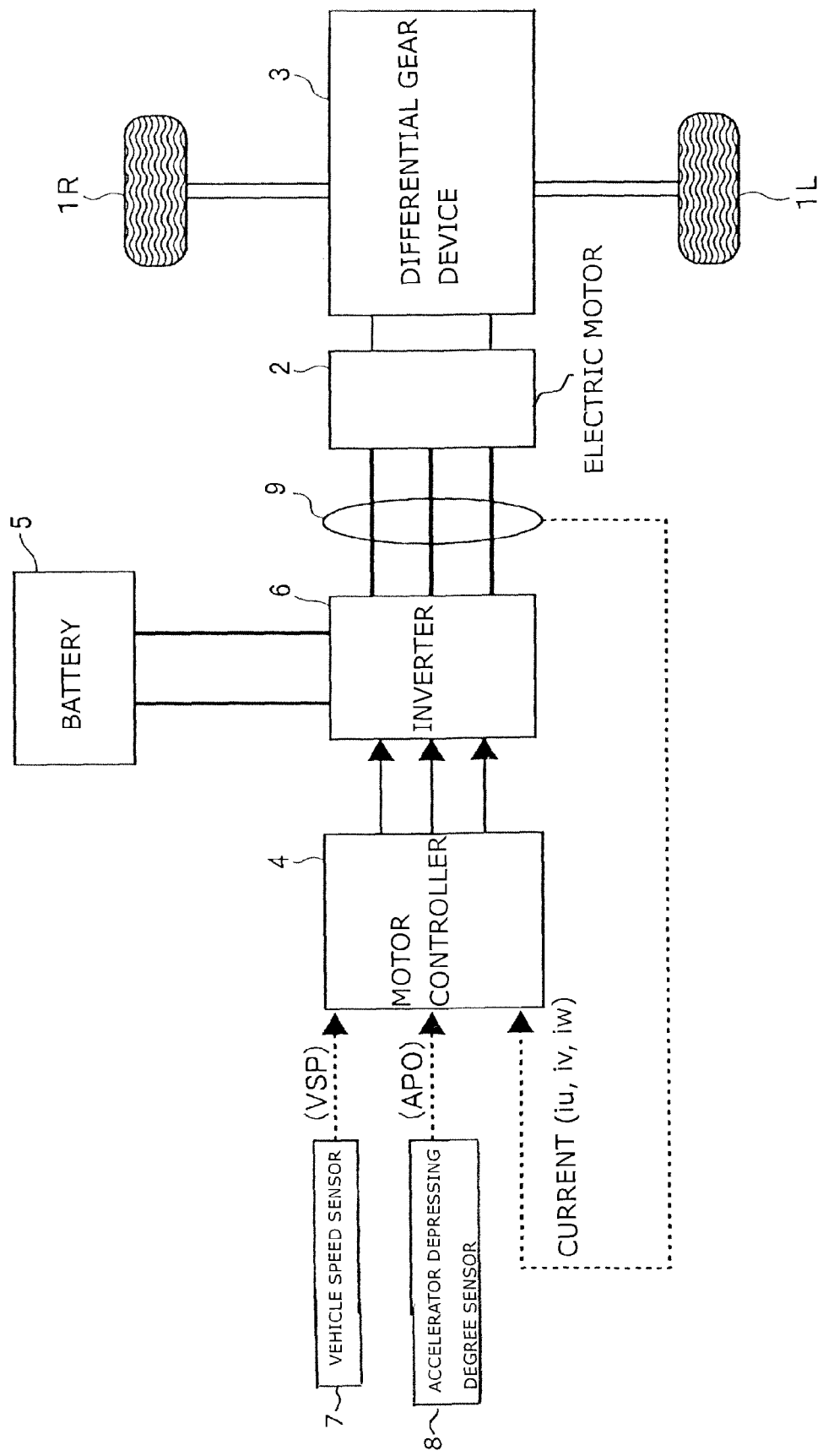
FIG. 1 is a schematic diagram showing a driving system and a control system for the driving system of a motor vehicle that is equipped with a motor torque response control device of an embodiment of the present invention.

FIG. 1 shows a driving system and a control system for the driving system of a motor vehicle that is equipped with a motor torque response control device of the embodiment of the present invention. It is to be noted that in the embodiment the motor vehicle shown in FIG. 1 is an electric motor vehicle that can run by driving left front and right front road wheels (or left rear and left right road wheels) 1L and 1R.

For driving left and right road wheels 1L and 1R, an electric motor (viz., driving power source) 2 powers left and right road wheels 1L and 1R through a differential gear device 3.

For controlling a driving force of electric motor 2, a motor controller 4 functions to cause an inverter 6 to carry out "DC-AC conversion" to the electric power of a battery 5 as a power source and feed electric motor 2 with the AC power to under control by inverter 6, so that the control of electric motor 2 is so made as to cause a torque of electric motor 2 to coincide with the result of an operation (viz., a target motor torque) effected in motor controller 4.

When the result of the operation (viz., target motor torque) effected in motor controller 4 is of a negative type that requires electric motor 2 to carry out a regenerative braking operation, motor controller 4 functions to provide electric motor 2 with a load of electric power generation through inverter 6.

In this case, the electric power generated as a result of the regenerative braking operation is fed to a battery 5 for recharging the same after being subjected to "AC-DC conversion" by inverter 6.

To motor controller 4, there are inputted, as information signals used for calculating the target motor torque, a signal from a vehicle speed sensor 7 that detects the vehicle speed VSP, viz., a ground speed of the electric vehicle, a signal from an accelerator position sensor 8 that detects an accelerator position APO (or a load required by the electric motor), viz., a degree of depression of the accelerator pedal by the driver, and a signal from a current sensor 9 that detects currents (viz., currents iu, iv and iw since in case of FIG. 1, a three-phase alternating current including U-phase current, V-phase current and W-phase current) flowing in electric motor 2.

Based on these inputted information signals, motor controller 4 produces a PWM signal for controlling electric motor 2, and produces a driving signal for inverter 6 in accordance with the PWM signal through a drive circuit.

Inverter 6 has for example two switching elements (for example, power semiconductor device, such as IGBT or the like) for each phase, converts (viz., invert conversion) DC current from battery 5 to AC current by carrying out ON/OFF operation of the switching elements in accordance with the driving signal, and feeds electric motor 2 with a current that corresponds to the target motor torque.

Based on the AC current supplied from inverter 6, electric motor 2 produces a driving force in accordance with the current, and transmits the driving force to left and right road wheels 1L and 1R through differential gear device 3.

In a so-called reverse driving state in which during a vehicle cruising electric motor 2 is turned by left and right road wheels 1L and 1R, a load of electric power generation is applied to electric motor 2 to cause electric motor 2 to carry out a regenerative braking operation, so that a kinetic energy of the motor vehicle is regenerated and fed to battery 5 for recharging the same.

[Torque Response Control of the Electric Motor]

Figure 2:
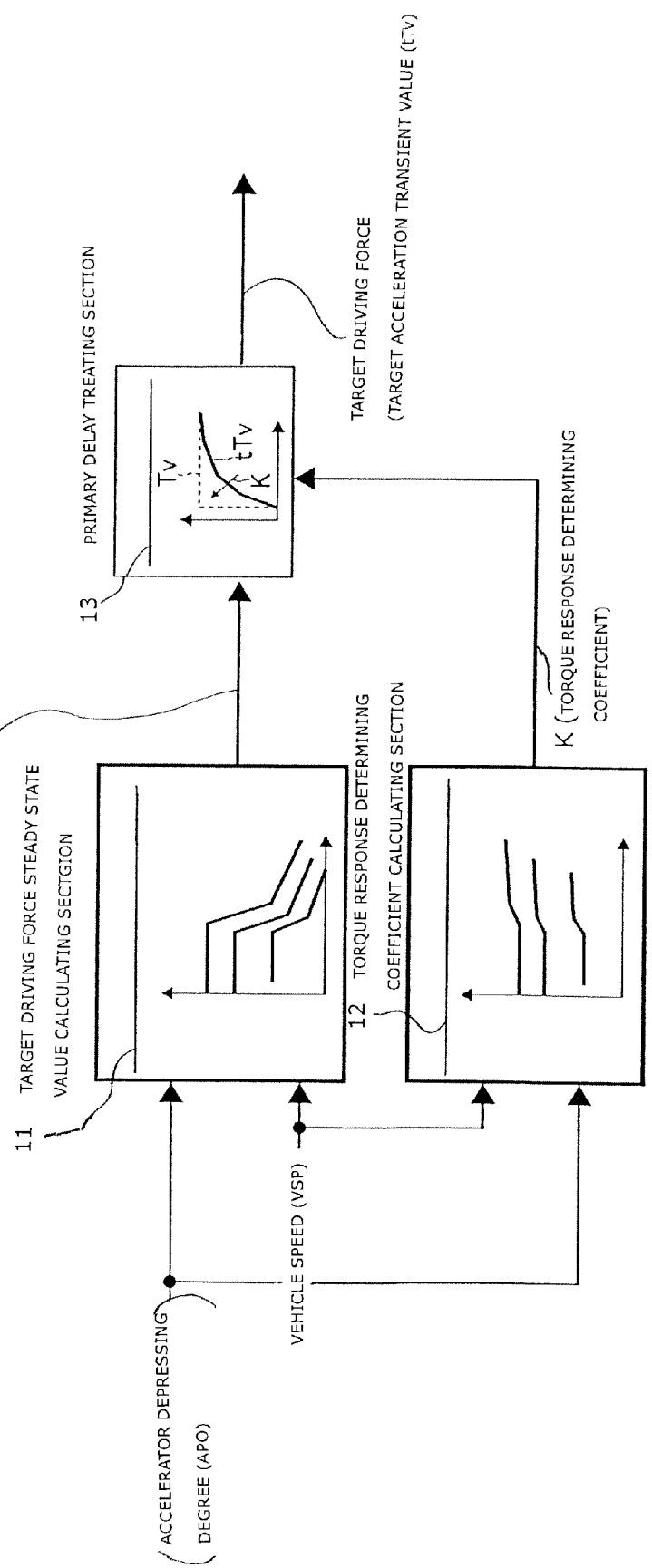
FIG. 2 is a functional block diagram that depicts a motor torque response control section of a motor controller shown in FIG. 1.

Motor controller 4 derives a transient value tTv of a target driving force (or target acceleration) by carrying out the operation shown in the functional block diagram of FIG. 2, and orders inverter 6 to carry out the driving control of electric motor 2 while treating a motor torque capable of realizing the transient value tTv of the target driving force (or target acceleration) as the above-mentioned target motor torque.

A target driving force (target acceleration) steady state value calculating section 11 in FIG. 2 calculates or derives a target driving force (target acceleration) steady state value Tv of the vehicle required by the driver from accelerator position APO and vehicle speed VSP with respect to a predetermined driving force map.

Figure 3:
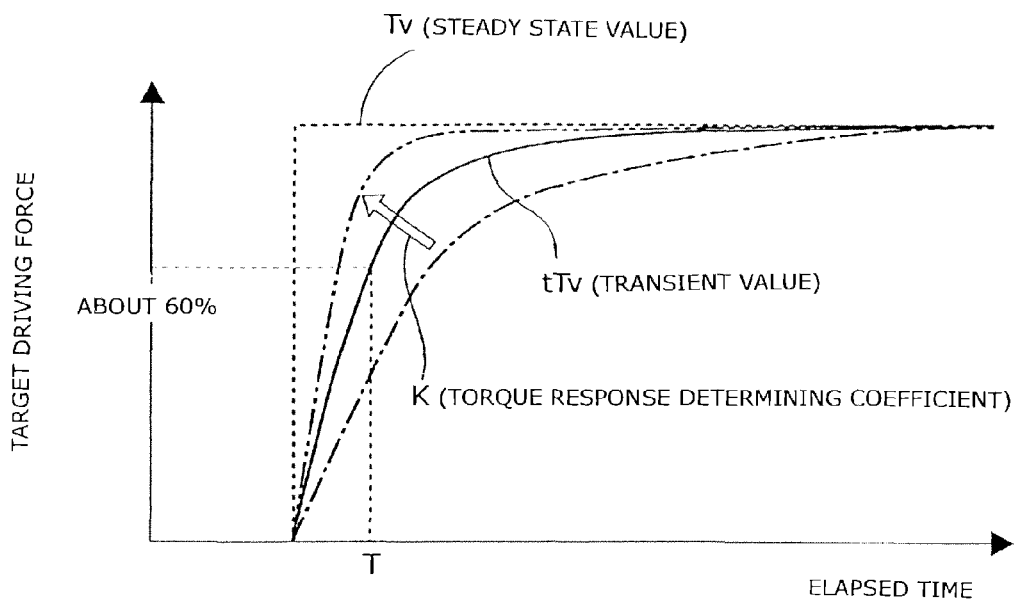
FIG. 3 is a time chart of an operation effected by the motor torque response control section shown in FIG. 2.

If the accelerator pedal is depressed stepwisely causing the accelerator position APO to instantly move from 0 to a corresponding position and thereafter the corresponding position is maintained, the target driving force (target acceleration) steady state value Tv increases with a step-wise time series change as is indicated by a broken line of FIG. 3.

In case where the target driving force (target acceleration) steady state value Tv is directly used for carrying out the driving control of electric motor 2, motor controller 4 orders inverter 6 to treat a motor torque capable of realizing the target driving force (target acceleration) steady state value Tv as the target motor torque.

Accordingly, the torque response of electric motor 2 is unambiguously determined in accordance with an output torque characteristic of electric motor 2 and thus the torque response is uncontrollable.

Figure 4:
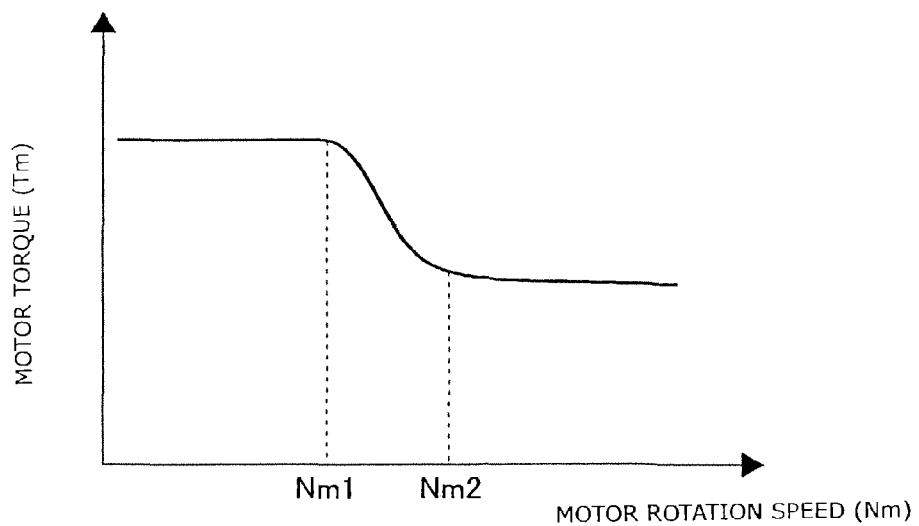
FIG. 4 is a motor torque characteristic diagram depicting a variation of a maximum motor torque relative to a rotation speed of an electric motor.

While, as is shown in FIG. 4, the characteristic of the maximum output torque of electric motor 2 shows a higher motor torque Tm in a lower range of the motor speed Nm, a lower motor torque Tm in a higher range of the motor speed Nm and a sharp depression of the motor torque Tm from the higher value to the lower value in a range between the motor speed ranges Nm1 and Nm2, which deviates largely from a torque characteristic that is needed by the motor vehicle.

Accordingly, due to its output torque characteristic, electric motor 2 can't realize a desired acceleration as expected, and thus, it tends to occur that the driver is given such a dissatisfaction that a vehicle running performance (viz., sense of acceleration) is not sufficient and a delicate driving manipulation is not effected due to an excessive torque.

However, in case of the electric motor vehicles that use electric motor 2 as a driving power source, employment of a commonly used technology, such as usage of a transmission for obtaining a desired acceleration, causes the transmission to become a factor for increasing a friction loss and besides this, since control of the transmission consumes energy, a travel distance of the vehicle becomes shorter, which is a serious problem, and thus, the above-mentioned commonly used technology can't be adopted.

Accordingly, in the embodiment, considering that electric motor 2 is a device of which output torque response is easily controlled unlike a power source such as an internal combustion engine or the like and the torque response control thus obtained can control a sense of acceleration sensed by the driver to such an extent that the driver is given a satisfaction, the idea is embodied to control the torque response of electric motor 2 in the following manner.

For the embodiment, as is shown in FIG. 2, there are provided a torque response determining coefficient calculating section 12 and a primary delay treating section 13 which correspond to a motor torque response control means of the present invention.

Figure 5:
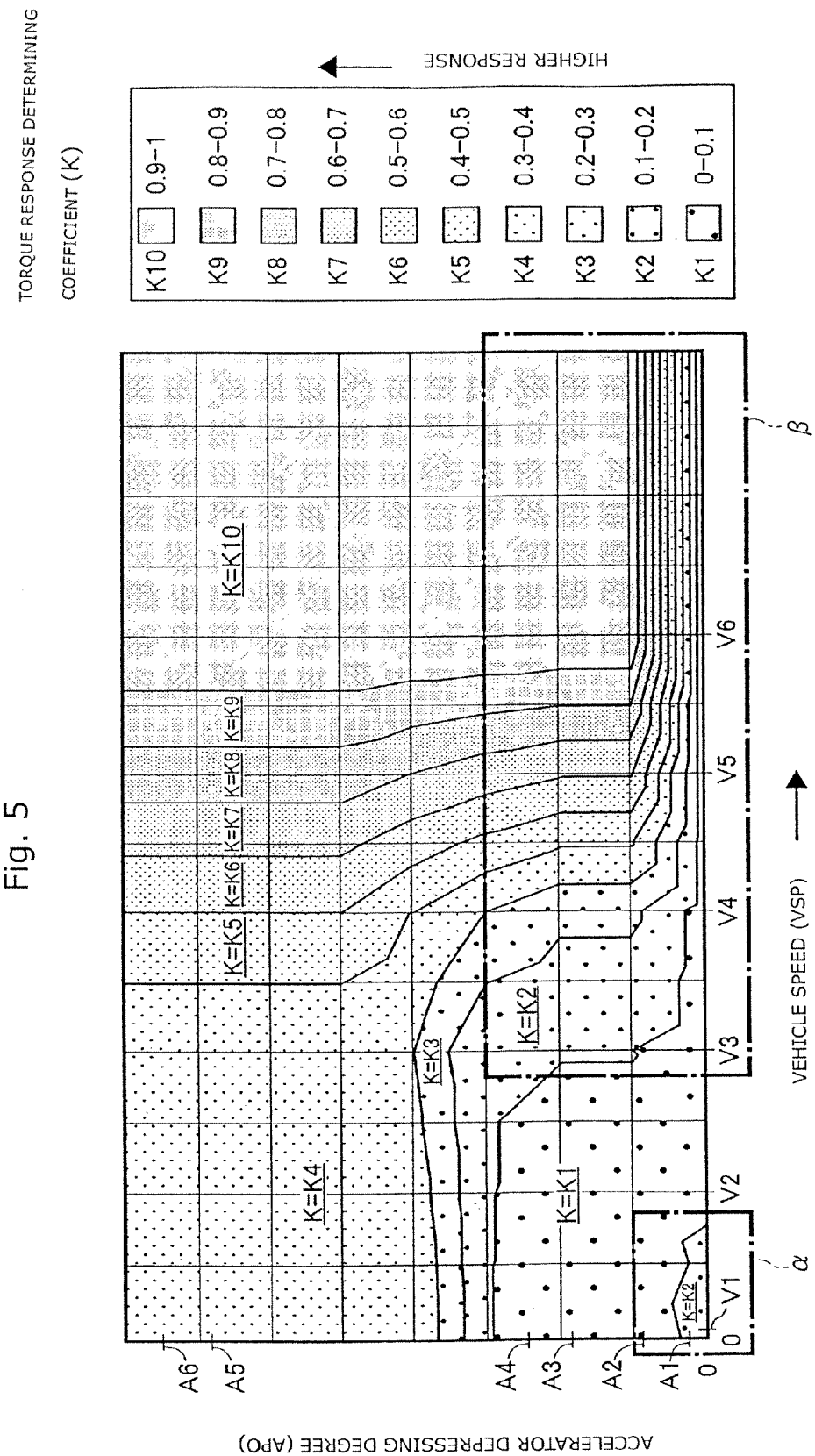
FIG. 5 is an area map of a torque response determining coefficient that is used by the motor torque response control device of the embodiment of FIGS. 1 to 3 for carrying out the torque response control.

In torque response determining coefficient calculating section 12, there is derived a coefficient k for determining a suitable torque response of electric motor 2 under a present operation condition (viz., vehicle speed VSP and accelerator position APO), with reference to a prearranged torque response determining coefficient area map as shown in FIG. 5 and the vehicle speed VSP and accelerator position APO plotted therein.

As is shown in FIG. 5, the torque response determining coefficient k is provided by diving a difference between 0 (zero) and 1 (one) into ten sections, and the torque response determining coefficient k=k1=0 to 0.1 of the first section is made to correspond to the lowest torque response, and the torque response determining coefficient k=k10=0.9 to 1 is made to correspond to the highest torque response.

With increase of the order of the sections from the first section, through the second section of the torque response determining coefficient being k=k2=0.1 to 0.2, the third section of the torque response determining coefficient being k=k3=0.2 to 0.3, the fourth section of the torque response determining coefficient being k=k4=0.3 to 0.4, the fifth section of the torque response determining coefficient being k=k5=0.4 to 0.5, the sixth section of the torque response determining coefficient being k=k6=0.5 to 0.6, the seventh section of the torque response determining coefficient being k=k7=0.6 to 0.7 and the eighth section of the torque response determining coefficient being k=k8=0.7 to 0.8 to the ninth section of the torque response determining coefficient being k=k9=0.8 to 0.9, the torque response is gradually increased.

FIG. 5 is an area map showing a suitable torque response (viz., torque response determining coefficient k) of electric motor 2 for each vehicle operation condition (viz., vehicle speed VSP and accelerator position APO), and a suitable motor torque response (viz., torque response determining coefficient k) for each vehicle operation condition will be described in detail hereinafter.

In torque response determining coefficient calculating section 12 shown in FIG. 2, the torque response determining coefficient k (k1 to k10) used for controlling the torque response of electric motor 2 is derived from the vehicle speed VSP and accelerator position APO with reference to the torque response determining coefficient area map of FIG. 5, and the derived coefficient is led to primary delay treating section 13.

In primary delay treating section 13, to the target driving force (target acceleration) steady state value Tv indicated by the broken line in FIG. 3 and derived in target driving force steady state value calculating section 11 in the above-mentioned manner, there is applied a primary delay treatment by means of a primary delay filter time constant corresponding to the torque response determining coefficient k (k1 to k10) led from torque response determining coefficient calculating section 12, so that the target driving force (target acceleration) transient value tTv is derived as is indicated by a solid line in FIG. 3.

The target driving force (target acceleration) transient value tTv indicated by the solid line in FIG. 3 is determined by the above-mentioned primary delay filter time constant, that is, the torque response determining coefficient k (k1 to k10).

In case where the torque response determining coefficient k (k1 to k10) is small, the target driving force (target acceleration) transient value tTv shows, as is indicated by the dot and dash line, a marked delay relative to the target driving force (target acceleration) steady state value Tv, which means that the torque response of electric motor 2 is low.

In case of this low torque response, even when the same torque increase is required by electric motor 2, the increase of the motor torque is moderately carried out, so that when it is necessary for the driver to delicately control the driving force, the driver can feel easiness with which the delicate driving manipulation is carried out.

While, in case where the torque response determining coefficient k (k1 to k10) is large, the target driving force (target acceleration) transient value tTv shows, as is indicated by the two-dot chain line, a small delay relative to the target driving force (target acceleration) steady state value Tv, which means that the torque response of electric motor 2 is high.

In case of this high torque response, even when the same torque increase is required by electric motor 2, the increase of the motor torque is instantly carried out, so that when it is necessary for the driver to produce a large driving force, the driver can feel a sense of acceleration that corresponds to the driving manipulation therefor.

The motor controller 4 shown in FIG. 1 sets the target driving force (target acceleration) steady state value tTv derived by primary delay treating section 13 in the above-mentioned manner as a target motor torque and controls inverter 6 in such a manner that electric motor 2 is fed with a current to realize the target motor torque.

The torque response (viz., torque response determining coefficient k) of electric motor 2 suitable for each vehicle operation condition (vehicle speed VSP and accelerator position APO), which is depicted in the area map of FIG. 5, will be described in detail in the following.

(1) As is seen from FIG. 4, it is usual that the torque characteristic of electric motor 2 shows that the maximum value of the motor torque Tm in a lower range of the motor speed Nm lower than Nm1 is higher than that in the other motor speed range, and the maximum value of the motor torque Tm in a higher range of the motor speed Nm equal to or higher than Nm2 is smaller than that in the other motor speed range.

Accordingly, in a higher speed range (viz., higher vehicle speed range), the motor torque Tm shows a little shortage and thus it tends to occur that the driver is given such a dissatisfaction that the vehicle running performance (viz., sense of acceleration) is not sufficient, and in a lower speed range (viz., lower vehicle speed range), the motor torque Tm is excessive and thus it tends to occur that the driver is given such a dissatisfaction that a delicate driving manipulation for a delicate driving force control frequently required in such lower speed range is not easily effected.

Figure 6:
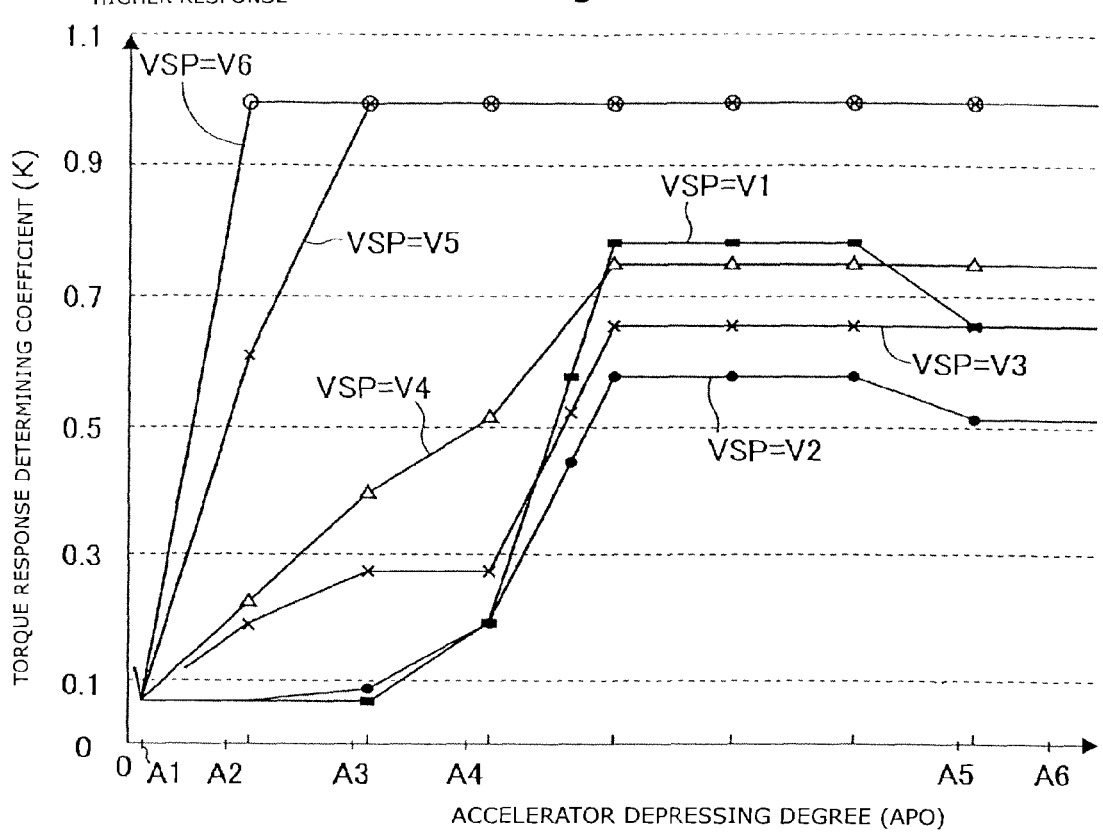
FIG. 6 is a characteristic diagram depicting a variation of the torque response determining coefficient using a vehicle speed VSP as a parameter in a case where the area map of FIG. 5 is redrawn with respect to the vehicle speed VSP from V1 to V6.
Figure 7:
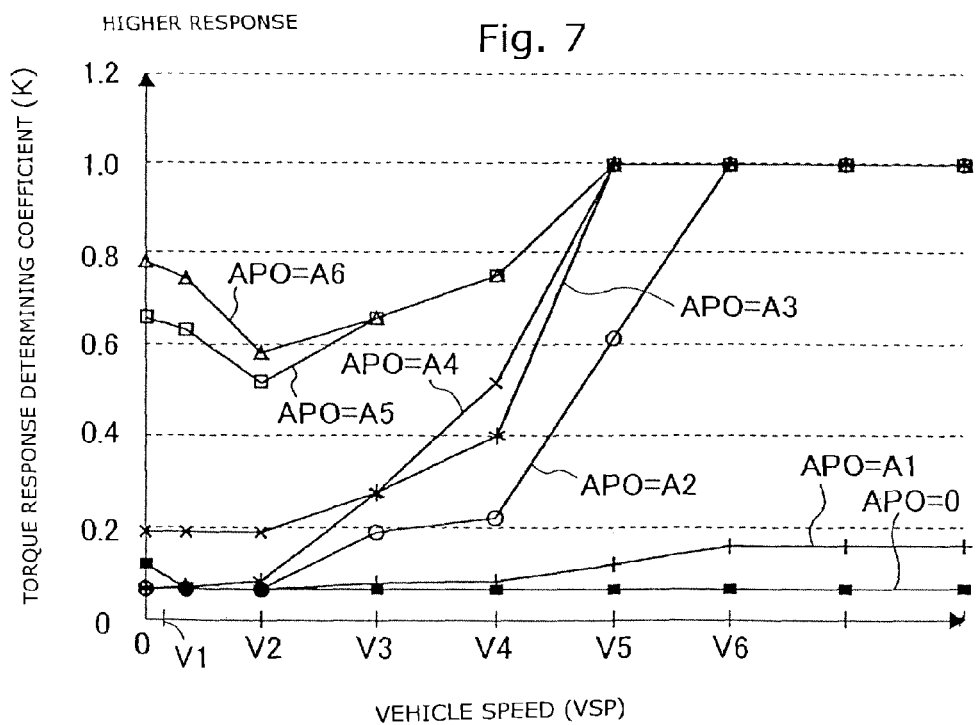
FIG. 7 is a characteristic diagram depicting a variation of the torque response determining coefficient using an accelerator position (or accelerator depressing degree) APO as a parameter in a case where the area map of FIG. 5 is redrawn with respect to the accelerator position APO from 0, A1 to A6.

Accordingly, in the embodiment, as is seen from FIG. 5 and as is clearly understood from both FIG. 6 that redraws the area map of FIG. 5 particularly in case where the vehicle speed VSP is from V1 to V6 and FIG. 7 that redraws the area map of FIG. 5 particularly in case where the accelerator position APO is from A1 to A6, when the vehicle speed VSP is low, the torque response determining coefficient k is made small to lower the torque response of electric motor 2, and when the vehicle speed VSP is high, the torque response determining coefficient k is made high and increased as the vehicle speed increases, thereby to increase or improve the torque response of electric motor 2.

However, when the torque response of electric motor 2 is made too high, a torsional vibration is inevitably produced in the motor driving system, which lowers a ride quality of the vehicle, and thus, when the torque response of electric motor 2 is set to a higher level, it is necessary to select the highest one in a response range that does not cause the driving system to produce the torsional vibration, the highest one being different for each vehicle speed.

(2) While, in a smaller load area where the accelerator position APO (viz., load required by electric motor 2) is small in the throttle opening, it often occurs that a delicate driving force control by a delicate driving manipulation is required by the driver, and if, in the smaller load area, the torque response of electric motor 2 is kept high, the driver feels that it is difficult to carry out the above-mentioned delicate driving manipulation.

Furthermore, in the smaller load area where the accelerator position APO is small in the throttle opening, it often occurs that that the driver releases his or her foot from the accelerator pedal unconsciously, and if, in the smaller load area, the torque response of electric motor 2 is kept high, the above-mentioned unconscious release of the accelerator pedal brings about a rapid deceleration of the vehicle making passengers uncomfortable.

While, in a larger load area where the accelerator position APO is large in the throttle opening, the driver requires a sufficient acceleration induced by a large driving force, and if, in this larger load area, the torque response of electric motor 2 is kept low, the driver can not feel a sense of acceleration to such an extent that the driver expects when operating the accelerator pedal and thus the driver is given such a dissatisfaction that the vehicle running performance (viz., sense of acceleration) is not sufficient.

Accordingly, as is seen from FIGS. 5 to 7, in the embodiment, when the accelerator position APO (viz., load required by electric motor 2) is small, the torque response determining coefficient k is made small to lower the torque response of electric motor 2, and when the accelerator position APO (viz., load required by electric motor 2) is large and thus the required load is large, the torque response determining coefficient k is made large to increase or improve the torque response of electric motor 2.

Also in this case, it goes without saying that the high torque response of electric motor 2 should be selected to the highest one in a response range that does not cause the driving system to produce a torsional vibration which lowers a ride quality of the vehicle.

(3) In a creep running area (viz., α-area in FIG. 5) where the vehicle speed is very low and the load is very low, the above explanation of items (1) and (2) suggest that the torque response determining coefficient k is made to the minimum value k1 to cause the torque response of electric motor 2 to take the minimum level. However, since, in the creep running area, the vehicle takes such a running mode that the accelerator pedal is hardly depressed, a certain degree of acceleration is needed. Thus, in such area, the torque response determining coefficient k is made to the value k2 that is larger than the minimum value k1 by one rank, so that the torque response of electric motor 2 is made higher than the minimum response by one rank.

In case where as is seen from FIG. 4, the motor speed Nm is in a range from the speed Nm1 to the speed Nm2 wherein the motor torque Tm shows a sharp depression with increase of motor speed Nm, the driver feels a lack of acceleration due to the sharp depression of the motor toque Tm in response to the speed increase (increase of vehicle speed) of the motor. Thus, it is necessary to suppress the driver from feeling the lack of acceleration as much as possible by compensating it by making the motor torque response higher.

Accordingly, in the embodiment, as is seen from FIG. 5, in a medium speed area V3 to V5 that corresponds to the above-mentioned motor speed range from Nm1 to Nm2, a variation density of the torque response determining coefficient k relative to the vehicle speed VSP, that is, a variation density in torque response of electric motor 2 relative to the vehicle speed VSP is made higher than the other variation density (viz., variation density in torque response) of torque response determining coefficient k set in the other vehicle speed area.

In an area indicated by "β" in FIG. 5, that is, in a medium and high vehicle speed area where the load is small or medium with the accelerator position APO being smaller than A4 and the vehicle speed VSP is equal to or higher than V3, an acceleration response at the time of depressing the accelerator pedal in the medium and high vehicle speed area is regarded as important.

In view of this requirement, in the embodiment, as is indicated by the β— area in FIG. 5, in the small and medium load and medium and high vehicle speed area where APO<A4 and VSP≥V3 are established, the variation density of the torque response determining coefficient k relative to the accelerator position APO (viz., required load), that is, the variation density in torque response of electric motor 2 relative to the accelerator position APO (viz., required load) is made higher than the variation density (viz., variation density in torque response) of the torque response determining coefficient k that is set in the larger load area where APO≥A4 is established.

In the larger load area where APO≥A4 is established, the area setting mentioned in the above-mentioned item (2) causes the torque response determining coefficient k to take the maximum value determined for each vehicle speed VSP thereby causing the torque response of electric motor 2 to take the highest one, and thus, the sense of the highest acceleration required by the driver under the larger load can be assuredly felt by the driver.

As is mentioned hereinabove, the highest torque response of electric motor 2 is the highest one provided in a torque response range that does not produce a torsional vibration in the motor driving system which lowers a ride quality of the vehicle, and the highest one differs for each vehicle speed VSP.

[Effects]

According to the torque response control of electric motor 2 based on FIG. 5 in the embodiment, the following effects are obtained.

(1) That is, when the vehicle speed VSP (viz., motor speed Nm) is low, the torque response determining coefficient k is made small to make the torque response of electric motor 2 low and as the vehicle speed VSP (viz., motor speed Nm) is increased, the torque response determining coefficient k is increased to make the toque response of electric motor 2 higher. Thus, the following effects are obtained.

That is, as is shown in FIG. 4, in a lower speed range (viz., lower vehicle speed range), the motor torque Tm is large and thus, the lower speed range is a range that causes the driver to feel that a delicate driving manipulation needed for a delicate driving power control frequently required by the lower speed range (viz., lower vehicle speed range) is difficult for him or her. However, in the embodiment, in such lower speed range (viz., lower vehicle speed range), the torque response determining coefficient k is made small to lower the torque response of electric motor 2, and thus, the driver can carry out the above-mentioned delicate driving manipulation for the delicate driving power control.

While, as is seen from FIG. 4, in a higher speed range (viz., higher vehicle speed range), the motor torque Tm is small and thus, the driver tends to be given such a dissatisfaction that a vehicle running condition (viz., sense of acceleration) is not sufficient due to touch of lack of motor torque in the higher speed range (viz., higher vehicle speed range). However, in the embodiment, with increase of the vehicle speed VSP (viz., motor speed N), the torque response determining coefficient k is increased to make the torque response of electric motor 2 higher. Thus, the above-mentioned dissatisfaction on the sense of acceleration is solved or at least minimized due to quick increase of torque.

(2) In a small load case where the accelerator position APO (viz., load required by electric motor 2) is small, the torque response determining coefficient k is made small to make the torque response of electric motor 2 low and with increase of the load, the torque response determining coefficient k is increased to make the torque response of electric motor 2 higher. Thus, the following effects are obtained.

That is, in a small load area where the accelerator position APO is small, it often happens that a delicate driving manipulation for a delicate driving power control is required by the driver. However, if, during such time, the torque response of electric motor 2 is high, the driver feels that it is difficult to carry out the above-mentioned delicate driving manipulation.

Furthermore, in the small load area where the accelerator position APO is small, it tends to occur that the driver releases his or her foot from the accelerator pedal unconsciously, and if, in the small load area, the torque response of electric motor 2 is kept high, the above-mentioned unconscious release of the accelerator pedal brings about a rapid deceleration of the vehicle making passengers uncomfortable.

However, in the embodiment of the invention, in the small load area, the torque response determining coefficient k is made small to make the torque response of electric motor 2 low, and thus, the driver can carry out the above-mentioned delicate driving manipulation with ease, and thus, he or she is suppressed from feeling that such driving manipulation is difficult.

Furthermore, in the small load area, even when the driver happens to release his or her foot from the accelerator pedal unconsciously, keeping the torque response of electric motor 2 to the lower level does not bring about such an undesired phenomenon that release of the accelerator pedal instantly induces a rapid deceleration of the vehicle causing the passengers to feel uncomfortable.

While, in a larger load area where the accelerator position APO is large, a sufficient acceleration by a larger driving force is inevitably required by the driver. However, if, in this time, the torque response of electric motor 2 is kept low, the driver can not feel a sense of acceleration to such an extent that the driver expects when opening the accelerator pedal and thus he or she is given a dissatisfaction.

However, in the embodiment, with increase of the load, the torque response determining coefficient k is increased to make the torque response of electric motor 2 higher, and thus, due to a rapid torque increase, the driver can feel the sense of acceleration as he or she expects when operating the accelerator pedal or at least feel a sense near the sense, and thus, the above-mentioned dissatisfaction on the sense of acceleration is solved or at least eased.

(3) According to the torque response control in accordance with the vehicle speed VSP and accelerator depression degree APO that is described in items (1) and (2), in a creep running area (viz., α-area in FIG. 5) where the vehicle speed is very low and the load is very low, the torque response determining coefficient k is made to the minimum value k1 to cause the torque response of electric motor 2 to take the minimum level.

However, since, in the creeping running area, the vehicle takes such a running mode that the accelerator pedal is hardly depressed, a certain degree of acceleration is needed, and thus, under such minimum torque response, a desired creeping running is not obtained.

While, in the embodiment of the invention, the torque response determining coefficient k is made to the value k2 that is larger than the minimum value k1 by one rank, so that the torque response of electric motor 2 is made higher than the minimum response by one rank. Thus, it becomes possible to get an acceleration of such a degree as to be required by the creeping running and thus the creeping running can be carried out with such acceleration.

(4) Furthermore, in the embodiment of the invention, as is seen from FIG. 4, in the medium speed area V3 to V5 corresponding to the motor speed range from Nm1 to Nm2 where the motor torque Tm is sharply reduced with increase of the motor speed Nm, the variation density of the torque response determining coefficient k relative to the vehicle speed VSP, that is, the variation density in torque response of electric motor 2 is made higher than the other variation density (viz., variation density in torque response) of torque response determining coefficient k set in the other vehicle speed area. With this, the following effects are obtained.

That is, in the motor speed range from Nm1 to Nm2 where the motor torque Tm is sharply reduced with increase of the motor speed Nm, the driver feels dissatisfaction due to presence of the rapid drop of the motor torque that is induced in response to increase of the motor rotation speed (viz., increase in vehicle speed).

However, in the embodiment of the invention, in the medium speed area V3 to V5 corresponding to the motor speed range from Nm1 to Nm2, the variation density of the torque response determining coefficient k relative to the vehicle speed VSP (viz., variation density in torque response of electric motor 2 relative to the vehicle speed VSP) is made higher than the other variation density (viz., variation density in torque response) of torque response determining coefficient k set in the other vehicle speed area. Accordingly, in the motor speed range from Nm1 to Nm2 (viz., medium speed area V3 to V5), a quick response of the motor torque becomes possible and thus, the driver can be protected from feeling the lack of acceleration as much as possible while compensating the lack of acceleration caused by the above-mentioned rapid depression of the motor torque Tm.

(5) In addition to the above, in the embodiment, in the area indicated by "β" in FIG. 5, that is, in a medium and high vehicle speed area where the load is small or medium with the accelerator position APO being smaller than A4 and the vehicle speed VSP is equal to or higher than V3, the variation density of the torque response determining coefficient k relative to the accelerator position APO (viz., required load), that is, the variation density in torque response of electric motor 2 relative to the accelerator position APO (viz., required load) is made higher than the variation density (viz., variation density in torque response) of the torque response determining coefficient k that is set in the larger load area where APO≥A4 is established.

That is, in such operation area (viz., the area indicated by "β" in FIG. 5) where the load is small or medium and the vehicle speed is medium or high, an acceleration response at the time of depressing the accelerator pedal is regarded as important.

In the embodiment of the invention, as is seen from the β-area in FIG. 5, in the small and medium load and high vehicle speed area where APO<A4 and VSP≥V3 are established, the variation density of the torque response determining coefficient k relative to the accelerator position APO (viz., required load), that is, the variation density in torque response of electric motor 2 relative to the accelerator position APO (viz., required load) is made higher than the variation density (viz., variation density in torque response) of the torque response determining coefficient k that is set in the larger load area where APO≥A4 is established. With this, the acceleration response that is regarded as important when the accelerator pedal is depressed in the above-mentioned medium and high vehicle speed range is improved and thus requirement by the driver in this time is assuredly fulfilled.

In the larger load area where APO≥A4 is established, the torque response determining coefficient k is made to the maximum value for each vehicle speed VSP to cause the torque response of electric motor 2 to take the maximum level for each vehicle speed VSP by carrying out the torque response control described in the above mentioned item (2). Accordingly, the sense of the highest acceleration required by the driver under the larger load can be assuredly felt by the driver.

In the embodiment of the invention, at the time of making the torque response of electric motor 2 to the highest torque response, the highest torque response is selected from a torque response range that does not produce a torsional vibration in the motor driving system which lowers a ride quality of the vehicle, which is described hereinabove in various cases and differs for each vehicle speed VSP. Thus, the above-mentioned advantageous effects induced by making the motor torque response to the highest one are obtained while meeting the condition wherein the ride quality of the vehicle is not lowered due to the torsional vibration in the motor driving system.

The invention claimed is:

1. A torque response control apparatus configured for an electric motor of a vehicle movable by driving road wheels of the vehicle using a torque from the electric motor, comprising:

a controller configured to:
compare a difference between a required acceleration that varies in accordance with a change of a driving condition of the vehicle and an actual acceleration that is obtained when the driving condition of the vehicle changes, the difference being caused by a torque characteristic of the electric motor in which a maximum torque is varied in accordance with a rotation speed of the electric motor, and
control a torque response of the electric motor by selecting a torque response determining coefficient in accordance with the actual acceleration,
wherein controlling the torque response of the electric motor is carried out in accordance with at least one of a vehicle speed and a required load for the electric motor.

2. The torque response control apparatus for the electric motor of the vehicle as claimed in claim 1, wherein the controller is configured to cause the torque response of the electric motor to be higher as the vehicle speed is higher.

3. The torque response control apparatus for the electric motor of the vehicle as claimed in claim 1, wherein the controller is configured to cause the torque response of the electric motor to be higher as a load desired by the electric motor is higher.

4. The torque response control apparatus for the electric motor of the vehicle as claimed in claim 1, wherein, in a creeping running area where the vehicle speed is very low and the load is very low, the controller is configured to cause the torque response of the electric motor to be higher than a minimum response.

5. The torque response control apparatus for the electric motor of the vehicle as claimed in claim 1, wherein, in a medium vehicle speed area where a torque characteristic of the electric motor undergoes a rapid change in rate, the controller is configured to cause a torque response variation density of the electric motor that varies in accordance with the vehicle speed to be higher than a torque response variation density provided at another vehicle speed area.

6. The torque response control apparatus for the electric motor of the vehicle as claimed in claim 1, wherein, in a range where the load is small or medium and the vehicle speed is medium or high, the controller is configured to cause a torque response variation density of the electric motor that varies in accordance with the load to be higher than a torque response variation density provided at a larger load area.

7. The torque response control apparatus for the electric motor of the vehicle as claimed in claim 1, the wherein the controller is configured to cause a maximum torque response of the electric motor provided at a larger load area to be the highest torque response provided in a range without producing a torsional vibration in a motor driving system.

* * * * *